United States Patent [19]

Dharmarajan et al.

[11] Patent Number: 6,150,467
[45] Date of Patent: *Nov. 21, 2000

[54] ELECTRICAL DEVICES INCLUDING ETHYLENE, α-OLEFIN, VINYL NORBORNENE ELASTOMERS AND ETHYLENE α-OLEFIN POLYMERS

[75] Inventors: Narayanaswami Raja Dharmarajan, Houston; Periagaram Srinivasan Ravishankar, Kingwood; Charles Douglas Burrage, Humble, all of Tex.

[73] Assignee: Exxon Chemical Patents, Inc., Baytown, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/014,903

[22] Filed: Jan. 28, 1998

Related U.S. Application Data

[62] Division of application No. 08/763,194, Dec. 10, 1996, Pat. No. 5,763,533.

[51] Int. Cl.[7] .......................... C08L 23/16; C08F 210/16
[52] U.S. Cl. ..................... 525/211; 525/237; 525/240
[58] Field of Search ........................ 525/211, 240, 525/237; 526/160, 170

[56] References Cited

U.S. PATENT DOCUMENTS

| | | | |
|---|---|---|---|
| 4,874,820 | 10/1989 | Cozewith | 525/240 |
| 5,011,891 | 4/1991 | Spenadel et al. | 525/211 |
| 5,096,867 | 3/1992 | Canich | 502/103 |
| 5,198,401 | 3/1993 | Turner et al. | 502/155 |
| 5,241,025 | 8/1993 | Hlatky et al. | 526/129 |
| 5,246,783 | 9/1993 | Spenadel et al. | 428/461 |
| 5,387,568 | 2/1995 | Ewen et al. | 502/104 |
| 5,656,693 | 8/1997 | Ellul et al. | 525/171 |
| 5,674,613 | 10/1997 | Dharmarajan et al. | 428/378 |
| 5,698,650 | 12/1997 | Jourdain et al. | 526/283 |
| 5,741,858 | 4/1998 | Brann et al. | 525/101 |

FOREIGN PATENT DOCUMENTS

| | | |
|---|---|---|
| 0 005 320 A2 | 11/1979 | European Pat. Off. |
| 0 277003 | 8/1988 | European Pat. Off. |
| 0 277004 | 8/1988 | European Pat. Off. |
| S61-151758 | 1/1988 | Japan |
| S62-210169 | 3/1989 | Japan |
| WO 91/09882 | 7/1991 | WIPO |
| WO 92/00333 | 1/1992 | WIPO |
| WO 93/11172 | 6/1993 | WIPO |
| WO 94/03506 | 2/1994 | WIPO |

*Primary Examiner*—Jeffrey C. Mullis

[57] ABSTRACT

Elastomeric polymers including ethylene, alpha-olefin and vinyl norbornene are shown to have improved extrusion characteristics, improved electrical properties, improved cure characteristics compared to ethylene, alpha-olefin, non-conjugated diene elastomeric polymers containing non-conjugated dienes other than vinyl norbornene. The elastomeric polymers containing vinyl norbornene generally have a branching index below 0.5. Such elastomeric polymers are combined with metallocene catalyzed ethylene, alpha-olefin copolymers to improve physical properties.

1 Claim, 4 Drawing Sheets

ELECTRICAL DEVICES INCLUDING ETHYLENE, α-OLEFIN, VINYL NORBORNENE ELASTOMERS AND ETHYLENE α-OLEFIN POLYMERS

This is a Divisional of Ser. No. 08/763,194, filed Dec. 10, 1996, now U.S. Pat. No. 5,763,533.

TECHNICAL FIELD

This invention relates to electrically conductive or semi-conductive devices having an insulating member including an ethylene, α-olefin, vinyl norbornene elastomeric polymer having a branching index of less than about 0.5 and a metallocene catalyzed ethylene α-olefin copolymer and the compounds made from the elastomeric polymer ethylene-copolymer combination providing elastomeric polymer based members having excellent surface characteristics and dielectric strength.

BACKGROUND

Typical power cables generally include one or more conductors in a core that is generally surrounded by several layers that can include a first polymeric semi-conducting shield layer, a polymeric insulating layer and a second polymeric semi-conducting shield layer, a metallic tape and a polymeric jacket. A wide variety of polymeric materials have been utilized as electrical insulating and semi-conducting shield materials for power cable and numerous other electrical applications.

In elastomer or elastomer-like polymers often used as one or more of the polymer (insulation) members in power cables, common ethylene, α-olefin, non-conjugated diene elastic polymers materials that have come into wide use usually include ethylene, α-olefin, and a non-conjugated diene selected from the group consisting of 5-ethylidene-2-norbornene (ENB), 1,4-hexadiene (HD), 1,6 octadiene, 5-methyl-1,4 hexadiene, 3,7-dimethyl-1,6-octadiene, and the like. Such polymers can provide a good insulating property for power cables. However, generally selection of one of these elastomeric polymers while bringing certain advantages, also brings some disadvantages as well. For instance, electrical compounds containing some of these polymers usually necessitate slower extrusion rates than might be desirable for optimum output, because surface characteristics of the extrudate in a compound based on these elastomeric polymers will not be as smooth as desired if the extrusion rates are higher. By choosing elastomeric polymers containing 5-vinyl-2-norbornene (VNB), a higher level of extrusion output can be achieved in the compound usually due to a higher level of branching, but some diminution of physical properties (over the less branched material) may result.

Much of the production of insulated electrical devices would see an advantage from higher throughput or extrusion rates (eg, lowering manufacturing costs) but many of the so called conventional elastomeric polymers, especially those based on 1,4-Hexadiene and ENB, would exhibit a tendency to cure slowly.

There is a commercial need for an elastomeric polymer ethylene alpha-olefin copolymer blend insulating material for electrical devices that can be extruded relatively rapidly, in the substantial absence of surface roughness, having a relatively rapid cure rate, relatively high cure state and relatively low electrical loss. There is also a need for improved long term heat aging and lower cure additives consumption, all of which may reduce the overall manufacturing cost and/or improve quality of the cable insulation.

SUMMARY

We have discovered that polymeric insulation for electrical conducting devices, when it includes an ethylene, alpha-olefin, vinyl norbornene elastomeric polymer with a relatively low branching index, indicative of long chain branching, will provide a smooth surface at relatively high extruder speeds, and generally will cure faster to a higher cure state than previously available ethylene, alpha-olefin, non-conjugated diene elastomeric polymers. Additionally, inclusion of a minority component of metallocene catalyzed ethylene alpha-olefin copolymer (hereinafter m-ethylene copolymer) enhances the physical properties of the elastomeric polymer in an electrical insulating compound based on the combination or blend.

According to one embodiment of our invention, an electrically conductive device is provided including (a) an electrically conductive member comprising at least one electrically conductive substrate; and (b) at least one electrically insulating member in proximity to the electrically conductive member. In this embodiment the insulating member includes an elastomeric polymer selected from the group consisting of ethylene, polymerized with at least one α-olefin, and vinyl norbornene. The insulating member also includes up to about 30, preferably up to about 25, more preferably up to about 20, most preferably up to about 15 parts per hundred parts of elastomeric polymer (pphep) of a m-ethylene copolymer.

The elastomeric polymers of various embodiments of our invention may contain in the range of from about 50–90 mole percent ethylene preferably about 65–90 mole percent, more preferably about 68–80 mole percent based on the total moles of the polymer. The elastomeric polymer contains the alpha-olefin in the range of from about 10–50 mole percent, preferably in the range of from about 10–35 mole percent, more preferably in the range of from about 20–32 mole percent. The elastomeric polymers will have a vinyl norbornene content in the range of from 0.16–5 mole percent, more preferably 0.16–1.5 mole percent, most preferably 0.16–0.4 mole percent based on the total moles of the polymer. The elastomeric polymer will also have a Mooney viscosity (ML [1+4] 125° C.) generally in the range of from about 10–80. The elastomeric polymer will have a $M_{w,GPC,LALLS}/M_{n,GPC,DRI}$ ($M_w/M_n$) greater than about 6.

The m-ethylene copolymer will generally be a copolymer of ethylene and at least one alpha-olefin, selected from one of butene-1,4-methyl-1-pentene, pentene-1, hexene-1, octene-1 and combinations thereof. Such copolymers may be generally characterized in that they will have a $M_w/M_n$ of 3 or less, and a Composition Distribution Breadth Index (CDBI) greater than 50%. Electrical insulating and/or semi-conducting compounds using these elastomeric polymer blends with m-ethylene copolymers, may be made using fillers and other constituents well known to those of ordinary skill in the art.

To attain the same cure state as commercially available ethylene, alpha-olefin, non-conjugated diene elastomeric polymers with the diene selected for example from the group consisting of 5-ethylidene-2-norbornene, 1,4-hexadiene, 1,6 octadiene, 5-methyl-1,4 hexadiene, 3,7-dimethyl-1,6-octadiene, and the like, the elastomeric polymer/m-ethylene copolymer blends described in an embodiment of our invention require lower diene levels, at substantially equivalent curative levels.

Alternatively, at the same diene content as these other ethylene, alpha-olefin, non-conjugated diene elastomeric polymers, lower curative levels will be necessary to reach the same or a higher cure state. The ethylene, alpha-olefin, vinyl norbornene elastomeric polymers of certain embodiments of our invention have a branching index below about 0.5 The lower branching index representative of the majority component of the blend permits the extruded insulating members to have a smoother surface at higher extrusion rates and a lower die swell compared to previously available commercial materials. Owing to lower diene content, the ethylene, alpha-olefin, vinyl norbornene elastomeric polymers of certain embodiments of our invention, required to achieve the same cure state as previously available ethylene, alpha-olefin, non-conjugated diene elastomeric polymer, the compounds formulated with the elastomeric polymers of our invention generally exhibit improved heat aging performance relative to the previously available ethylene, alpha-olefin, non-conjugated diene elastomeric polymer compounds. This heat aging benefit also accrues to the blends of the present invention.

These and other features, aspects, and advantages of the present invention will become better understood with reference to the following description and appended claims.

BRIEF DESCRIPTION OF DRAWINGS

These and other features, aspects, and advantages of the present invention will become better understood with reference with the following description, appended claims, and accompanying drawings where:

All compounds described in FIGS. 1–7 are based on a formulation called Superohm 3728 as shown in Table 9, containing 60 parts of clay.

Figure 8:
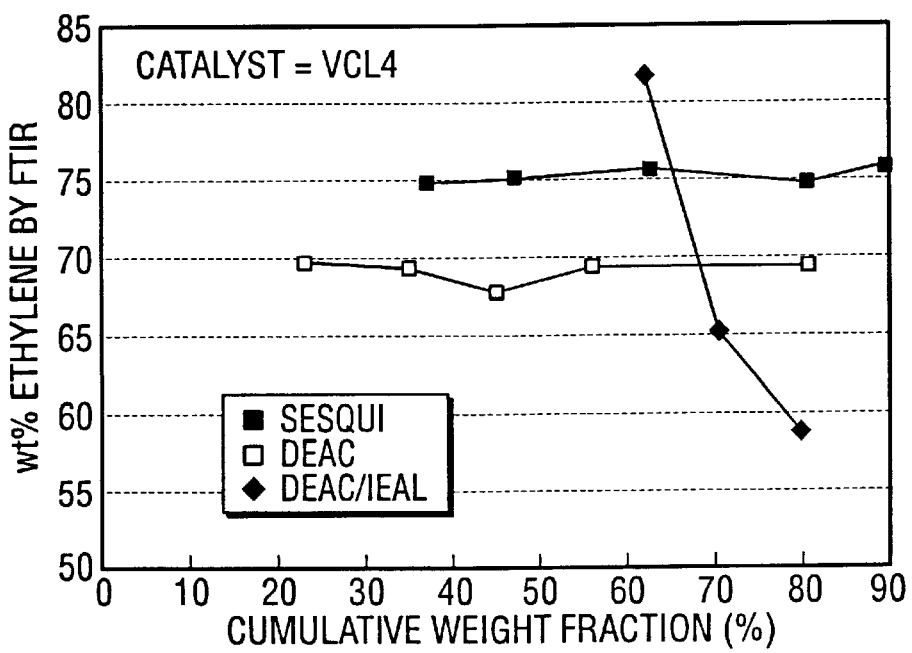

FIG. 8 shows the compositional distribution of elastomeric polymers made with different co-catalysts.

DESCRIPTION

Introduction

Various embodiments of the present invention concern certain elastomeric polymer m-ethylene copolymer blend compositions, certain compound compositions and applications based on the elastomeric polymer and the compounds made therefrom. These elastomeric polymer m-ethylene copolymer blend compositions have properties when used in an electrically conducting device which make them particularly well-suited for applications that require excellent surface characteristics, faster cure rates, more complete cure state, lower amounts of curative agent, and improved dielectric properties.

Following is a detailed description of various preferred elastomeric polymer m-ethylene copolymer blend compositions within the scope of the present invention, preferred methods of producing these compositions, preferred m-ethylene copolymers that may be included in the compound, and preferred applications of these polymer compositions. Those skilled in that art will appreciate that numerous modifications of these preferred embodiments can be made without departing from the scope of this invention.

For example, although the properties of the elastomeric polymer and m-ethylene copolymer blend composition and compounds based on the blend are exemplified in electrical insulating applications, they will have numerous other electrical uses. To the extent our description is specific, it is solely for purpose of illustrating preferred embodiments of our invention and should not be taken as limiting the present invention to these specific embodiments.

The use of headings in the present application is intended to aid the reader, and is not intended to be limiting in any way.

Various values given in the text and claims are determined and defined as follows.

| No. | Test | Test Method | Units |
|---|---|---|---|
| 1 | Branching Index | Exxon (described here) | none |
| 2 | (elastomeric polymer composition determination) Ethylene | ASTM D3900 | wt % |
| 3 | Ethylidene Norbornene | FT. - Infra Red | wt % |
|   | Vinyl Norbornene | FT. - Infra Red | wt % |
| 4 | Mooney Viscosity | ASTM D 1646 - 94 | Mooney Units |
| 5 | Scorch Time | ASTM D 2084 - 93 | minutes |
| 6 | Cure Characteristics | ASTM D 2084 - 93 | |
|   | $M_L$ | | dN · m |
|   | $M_H$ | | dN · m |
|   | $t_{s2}$ | | minutes |
|   | $t_{c90}$ | | minutes |
|   | Cure State = $(M_H - M_L)$ | | dN · m |
|   | Cure Rate | | dN · m/min |
| 7 | 100% Modulus | ASTM D 412 - 92 | MPa |
| 8 | 300% Modulus | ASTM D 412 - 92 | MPa |
| 9 | Tensile Strength | ASTM D 412 - 92 | MPa |
| 10 | Elongation | ASTM D 412 - 92 | % |
| 11 | Surface Roughness (R) | Surfcom ® 110B Surface gauge | μm |
| 12 | Extrusion Mass Rate Screw Speed | Haake Rheocord 90 Extruder. Die Temperature = 110–125° C. Screw Speed = 25–95 RPM. Extruder L/D = 16/1. Die Diameter = 3.2 mm, Die Land Length = 9.5 mm, Die (L/D) = 3/1, Compression Screw = 2/1, Garvy Die and Round hole Die. | g/min rpm |

Various physical properties of compounds based on the elastomeric polymer, m-ethylene copolymer blends of certain embodiments of our invention and ranges for these properties are shown below. By compound we intend that the common elastomer industry meaning of the word be employed. That is the polymer component(s) (in the present application a blend) in combination with fillers, accelerants, curatives, extenders and the like are what make up a compound. All properties ascribed to compounds based on the blends of embodiments of the present invention are determined based on a compound (Superohm 3728) as shown in Table 9, unless otherwise specified. It should be understood that by changing amounts and proportions of such a compound physical properties can be effected. Such property differences can be seen for example in Tables 5–8, based on 30 phr clay. For this reason the subsequently claimed properties for compounds utilizing the blends are intended as a reference to the performance of the blends and should not be limited to the specific compound. Various physical properties of compounds based on the elastomeric polymers of certain embodiments of our invention and ranges of these properties are shown below.

| Test Condition | Units | Broad | Preferred | More Preferred |
|---|---|---|---|---|
| I Compound Properties | | | | |
| ML (1 + 8) 100 ° C. | MU | <35 | <33 | <30 |
| Cure State (MH-ML)) | dN · m | >90 | >92 | |
| Cure Rate | dN · m/min | >100 | >110 | >112 |
| Tensile Strength | MPa | >8.5 | >9 | >10 |
| Elongation | % | >250 | >275 | >300 |
| II Extrusion Properties @ 125° C. | | | | |
| Surface Roughness ($R_t$) @ 55 RPM | μm | <50 | <45 | |
| Mass Extrusion Rate @ 55 RPM | g/min | >65 | >70 | >75 |

In general peroxide levels in such compounds may be described as follows:

| Test Condition | Units | Broad | Narrow | Very Narrow |
|---|---|---|---|---|
| Peroxide Level | | | | |
| Dicumyl Peroxide | (gm mole/phr) × $10^{-3}$ | 3 to 89 | 3 to 45 | 9 to 25 |

In certain embodiments of the present invention, an electrically conductive device comprises: a) an electrically conductive member including at least one electrically conductive substrate; and b) at least one electrically insulating member substantially surrounding the electrically conducting member including a polymer being one of ethylene polymerized with an α-olefin and a non-conjugated diene, said α-olefin is one of propylene, butene-1,4-methyl-1-pentene, hexene-1, octene-1, decene-1, or combinations thereof, said non-conjugated diene being vinyl norbornene, wherein said polymer has a branching index (BI) (defined below) of up to about 0.5, preferably the BI of the elastomeric polymer is up to about 0.4, more preferably up to about 0.3, most preferably up to about 0.2; and a m-ethylene copolymer having a CDBI above 50%, preferably above 55%, more preferably above 60%, most preferably above 65%, and a $M_w/M_n$ less than 3, preferably less than 2.5. The insulating member includes up to about 30, preferably up to about 25, more preferably up to about 20, most preferably up to about 15 parts per hundred parts of elastomeric polymer (pphep) of a m-ethylene copolymer also expressed as 5–30 pphep, 5–25 pphep, 5–20 pphep and 5–15 pphep.

The Ethylene, Alpha-Olefin, Vinyl Norbornene Elastomeric Polymer

The Ziegler polymerization of the pendent double bond in vinyl norbornene (VNB) is believed to produce a highly branched ethylene, alpha-olefin, vinyl norbornene elastomeric polymer. This method of branching permits the production of ethylene, alpha-olefin, vinyl norbornene elastomeric polymers substantially free of gel which would normally be associated with cationically branched ethylene, alpha-olefin, vinyl norbornene elastomeric polymer containing, for instance, a non-conjugated diene such as 5-ethylidene-2-norbornene, 1,4-hexadiene, and the like. The synthesis of substantially gel-free ethylene, alpha-olefin, vinyl norbornene elastomeric polymers containing vinyl norbornene is discussed in Japanese laid open patent applications JP 151758, JP 210169, which we incorporated by reference herein for purposes of U.S. patent practice.

Preferred embodiments of the aforementioned documents to synthesize polymers suitable for this invention are described below:

The catalyst used are $VOCl_3$ (vanadium oxytrichloride) and $VCl_4$ (vanadium tetrachloride) with the latter as the preferred catalyst. The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL). As shown in FIG. 8, the choice of co-catalyst influences the compositional distribution in the polymer. The polymer with broader compositional distribution is expected to provide the best tensile strength in the dielectric cable compound. The polymerization is carried out in a continuous stirred tank reactor at 20–65° C. at a residence time of 6–15 minutes at a pressure of 7 kg/cm². The concentration of vanadium to alkyl is from 1 to 4 to 1 to 8. About 0.3 to 1.5 kg of polymer is produced per gm of catalyst fed to the reactor. The polymer concentration in the hexane solvent is in the range of 3–7% by weight. The synthesis of ethylene, alpha-olefin, vinyl norbornene polymers were conducted both in a laboratory pilot unit (output about 4 Kg/day), a large scale semi works unit (output 1 T/day), and a commercial scale production unit (output 200,000 kg/day).

A discussion of catalysts suitable for polymerizing our elastomeric polymer or other catalysts and co-catalysts contemplated are discussed in the two Japanese laid open patent applications incorporated by reference above.

The resulting polymers had the following molecular characteristics:

The intrinsic viscosity measured in decalin at 135° C. were in the range of 1–2 dl/g. The molecular weight distribution ($M_{w,LALLS}/M_{n,GPC/DRI}$) was >10. The branching index was in the range 0.1–0.3.

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 15 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these documents are incorporated by reference for purposes of U.S. patent practice.

For peroxide cure applications, vinyl norbornene containing ethylene, alpha-olefin, diene monomer elastomeric polymers require lower levels of peroxide to attain the same cure state compared to ethylene, alpha-olefin, diene monomer with ethylidene norbornene termonomer at the same level of incorporated diene. Typically 20 to 40% lower peroxide consumption can be realized using ethylene, alpha-olefin, vinyl norbornene. The efficiency of vinyl norbornene in providing high cross link density with peroxide vulcanization also permits a reduction in the overall diene level to attain the same cure state as ethylidene norbornene polymers. This results in enhanced heat aging performance, generally owing to lower diene incorporation. This unique combinations of improved processability, lower peroxide usage and enhanced heat aging are the benefits provided by ethylene, alpha-olefin, vinyl norbornene over conventional non-conjugated dienes such as ethylidene norbornene or 1–4, hexadiene or the like including terpolymer or tetrapolymers.

The relative degree of branching in ethylene, alpha-olefin, diene monomer is determined using a branching index factor. Calculating this factor requires a series of three laboratory measurements[1] of polymer properties in solutions. These are: (i) weight average molecular weight ($M_{w, LALLS}$) measured using a low angle laser light scattering (LALLS) technique; (ii) weight average molecular weight ($M_{w,DRI}$) and viscosity average molecular weight ($M_{v,DRI}$) using a differential refractive index detector (DRI) and (iii) intrinsic viscosity (IV) measured in decalin at 135° C. The first two measurements are obtained in a GPC using a filtered dilute solution of the polymer in tri-chloro benzene.

[1]VerStrate, Gary "Ethylene-Propylene Elastomers", Encyclopedia of Polymer Science and Engineering, 6, 2nd edition. (1986)

An average branching index is defined as:

$$BI = \frac{M_{v,br} \times M_{w,DRI}}{M_{w,LALLS} \times M_{v\,DRI}} \quad (1)$$

where, $M_{v,br}=k(IV)_{1/a}$;
and 'a' is the Mark-Houwink constant (=0.759 for ethylene, alpha-olefin, diene monomer in decalin at 135° C.).

From equation (1) it follows that the branching index for a linear polymer is 1.0, and for branched polymers the extent of branching is defined relative to the linear polymer. Since at a constant $M_n$, $(MW)_{branch} > (Mw)_{linear}$, BI for a branched polymers is less than 1.0, and a smaller BI value denotes a higher level of branching. It should be noted that this method indicates only the relative degree of branching and not a quantified amount of branching as would be determined using a direct measurement, i.e. NMR.

Ethylene Alpha-Olefin Copolymer Component

The ethylene alpha-olefin copolymers that are produced using metallocene catalysts include ionizing activators as well as alumoxanes is included as a component of the elastomeric polymer compound component can be any polyethylene, as long as the polyethylene component is a polyethylene with the following features:

|  | preferred | more preferred | most preferred |
|---|---|---|---|
| $M_w/M_n$ | <3 | <2.5 |  |
| CDBI | >50% | >60% | >65% |
| $M_z/M_n$ | <2 |  |  |

Generally these ranges dictate the use of a m-ethylene copolymer with a density in the range of from about 0.86–0.920, preferred 0.865–0.915, more preferred 0.87–0.91 g/cc, most preferred 0.88–0.90 g/cc. Densities referred to herein will generally be polymer or resin densities, unless otherwise specified.

There is a wide variety of commercial and experimental m-ethylene copolymer resins useful in the manufacture of electrical insulation included in certain embodiments of the present invention. A non-inclusive list is found below along with the general bulk resin properties as published:

TABLE A

| Commercial Designation | Density (g/cm3) | Melt Index (g/10 min.) | Type |
|---|---|---|---|
| Exact ® 3017* | 0.901 | 27 | eth/butene |
| Exact ® 3022* | 0.905 | 9.0 | eth/butene |
| Exact ® 4006* | 0.880 | 10 | eth/butene |
| Exact ® 4033* | 0.880 | 0.8 | eth/butene |
| Exact ® 4041* | 0.878 | 3.0 | eth/butene |
| Engage ® 8100** | 0.870 | 1.0 | eth/octene |

*available from Exxon Chemical Co., Houston, TX, U.S.A.
**available from Dow Chemical Co., Freeport, TX, U.S.A.

It will be understood that in general we contemplate that a large number of m-ethylene copolymers will be useful in the techniques and applications described herein. Included components: ethylene propylene copolymers, ethylene-1-butene copolymers, ethylene-1-hexene copolymers, ethylene-1-octene copolymers, ethylene-4-methyl-1-pentene copolymers, ethylene 1-decene copolymers, ethylene-1-pentene copolymers, as well as ethylene copolymers of one or more C4 to C20 containing alpha-olefins, and combinations thereof A nonexclusive list of such polymers: ethylene, 1-butene, 1-pentene; ethylene, 1-butene, 1-hexene; ethylene, 1-butene, 1-octene; ethylene, 1-butene, decene; ethylene, 1-pentene, 1-hexene; ethylene, 1-pentene, 1-octene; ethylene, 1-pentene, decene; ethylene, 1-octene; 1-pentene; ethylene 1-octene, decene; ethylene, 4-methyl-1-pentene, 1-butene; ethylene 4-methyl-1-pentene, 1-pentene; ethylene, 4-methyl-1-pentene, 1-hexene; ethylene 4-methyl-1-pentene, 1-octent; ethylene, 4-methyl-1-pentnet, decene. Included in the m-ethylene copolymers will be one or more of the above monomers included at a total level of 0.2–30 mole percent, preferably 0.5–4 mole percent, or such mole percents consistent with the resin densities contemplated.

Definitions and methods of determinations of CDBI may be found in U.S. Pat. No. 5,008,204 which is fully incorporated by reference herein for purposes of US patent practice.

The resin and product properties recited in this specifiction were determined in accordance with the following test procedures. Where any of these properties is referenced in the appended claims, it is to be measured in accordance with the specified test procedure.

| Property | Units | Procedure |
|---|---|---|
| Melt Index | dg/min. | ASTM D-1238(E) |
| Density | g/cc | ASTM D-1505 |

Preferred melt indexes for the m-ethylene copolymer are 0.5–150 preferably 0.5–50, more preferably 0.5–30 dg/min.

EXAMPLES

Ethylene, alpha-olefin, vinyl norbornene polymers are synthesized at diene levels varying from 0.3 to 2 weight percent and evaluated in medium voltage electrical compound formulations. A major portion of the compound data and replicate measurements are obtained with ethylene, alpha-olefin, vinyl norbornene elastomeric polymer having a diene content of 0.8 weight percent. Little benefit is observed in increasing the diene level beyond I weight percent, as it is possible to reduce the diene level below 1% and still retain both a high state of cure and substantial levels of branching. Table 1 shows the polymer characteristics of several ethylene, alpha-olefin, non-conjugated diene elastomeric polymers. Polymer 3 (comparative) is a commercially available ethylene, propylene, 1,4-hexadiene elastomeric polymer, Nordel® 2722 (available from E.I. DuPont). The ethylene, alpha-olefin, vinyl norbornene polymer from the commercial plant is referenced as Polymer 7. Table 1 shows the polymer characteristics of all the elastomeric polymers used in the compound formulations. Polymer 7 has a higher level of branching compared to polymer 3. The branching index for Polymer 7 is 0.1, while for Polymer 3 BI is >0. 5.

Compound Extrusion Characterization

Extrusion studies of the electrical compounds are performed in a Haake Rheocord® 90 extruder (L/D=16/1). A screw with a compression ratio of 2/1 (geometry typical for processing rubber compounds) is used in all extrusions. The extrusion temperature is maintained in the range of 110 to 125° C. The extruder screw speed is varied from 30 to 90 rpm so that extrusion properties could be monitored at varying extrusion rates. Samples are obtained after the torque and the pressure drop equilibrated to a steady value at a constant screw speed.

The mass throughput and the surface roughness of the extrudate are measured at different extruder screw speeds. The mass throughput is represented as the weight of the extrudate per unit time.

The surface roughness of the extrudate is measured using a Surfcom® 110 B surface gauge (manufactured by Tokyo Seimitsu Company). The Surfcome instrument contains a diamond stylus which moves across the surface of the sample subject to evaluation. This sample can range in hardness from metal or plastic to rubber compounds. The instrument records the surface irregularities over the length (assessment length) traveled by the diamond stylus. This surface roughness is quantified using a combination of two factors:

1. $R_a$ ($\mu$m), an arithmetic mean representing the departure of the extrudate surface profile from a mean line.
2. $R_t$ ($\mu$m), the vertical distance between the highest point and the lowest point of the extrudate roughness profile within the assessment length.

The Roughness Factor (R) is defined as:

$$R(\mu m)=R_a+0.1R_t.$$

and incorporates both the $R_a$ and $R_t$ terms. $R_t$ is given a lower weighting to adjust for its magnitude relative to $R_a$. In some cases the extrudate roughness is qualified by just $R_t$, the vertical distance between the highest and lowest point.

Blends of ethylene, alpha-olefin, vinyl norbornene elastomeric polymer with m-ethylene copolymer Table 2 shows medium voltage electrical compound formulations containing 30 phr clay with other additives. Herein phr (parts per hundred rubber) is used interchangeably with pphep. The clay, Translink® 37, is a calcined surface modified (vinyl modification) Kaolin available from Engelhard. Table 3 shows m-ethylene copolymers used in the examples. All of the compounding is performed in a 1600 cc Banbury internal mixer. The mixing conditions and procedures are shown in Table 4. The compounds discharged from the Banbury mixer were sheeted out in a two roll mill. The peroxide was added in the mill to 300 grams of the compound.

Table 5 compares the cure characteristics and physical properties of Polymer 7, (Example 1), Polymer 7 with Exact® 4033 (Example 2) and Exact® 4033 as the sole polymer (Example 3). The peroxide level is maintained at 6.5 phr in all the formulations. The peroxide used in the compounds of Table 5 is Dicup 40 KE, which is a 40 % active dicumyl peroxide supported on Burgess clay. The cure rate in Example 1 with the VNB containing elastomeric polymer is significantly higher than Example 1 and Example 3 compounds. All three examples (1, 2, and 3) have generally the same cure state. The tensile strength and elongation of Examples 2 and 3 are high compared to Example 1.

Table 6 shows the extrusion characteristics of Examples 1, 2, and 3. The mass extrusion rate increases with increasing extruder screw speed, but the extrudate surface generally worsens. At any given extruder speed, increasing the concentration of m-ethylene polymer in the compound enhances throughput but coarsens the extrudate surface. The m-ethylene copolymer compound with m-ethylene as the sole polymer (Example 3) shows significant melt fracture at low shear rates. The surface roughness of the compound containing the blend of VNB elastomeric polymer with m-ethylene copolymer (Example 2), even though coarser than Example 1, is still within acceptable limits.

Table 7 shows the cure characteristics of the compounds of Examples 4–8. The m-ethylene polymers listed in Table 3 were used in formulating with Polymer 7. Except for a small decrease in cure rate, addition of m-ethylene polymer does not alter cure characteristics relative to the control compound (Example 4). In the same examples, the addition of the m-ethylene copolymer improves the compounds tensile strength by about 19% and elongation by about 20%. Table 8 shows the extrusion characteristics of the same examples (4–8). The surface (characteristics of Examples 5 through 8 containing the m-ethylene copolymer) is somewhat rougher than Example 4, but is generally unacceptable from a surface roughness standpoint. The mass throughput of these compounds is higher than that of control Example 4.

Figure 1:
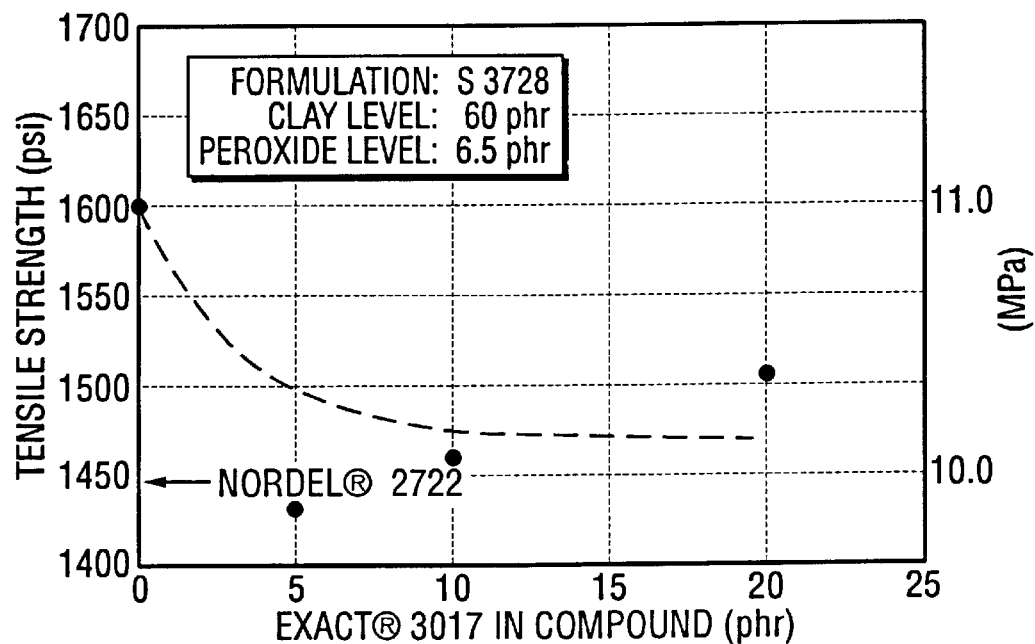
FIG. 1 shows the variation of tensile strength of a compound based on the blend with the percent of m-ethylene copolymer as part of the compound.
Figure 2:
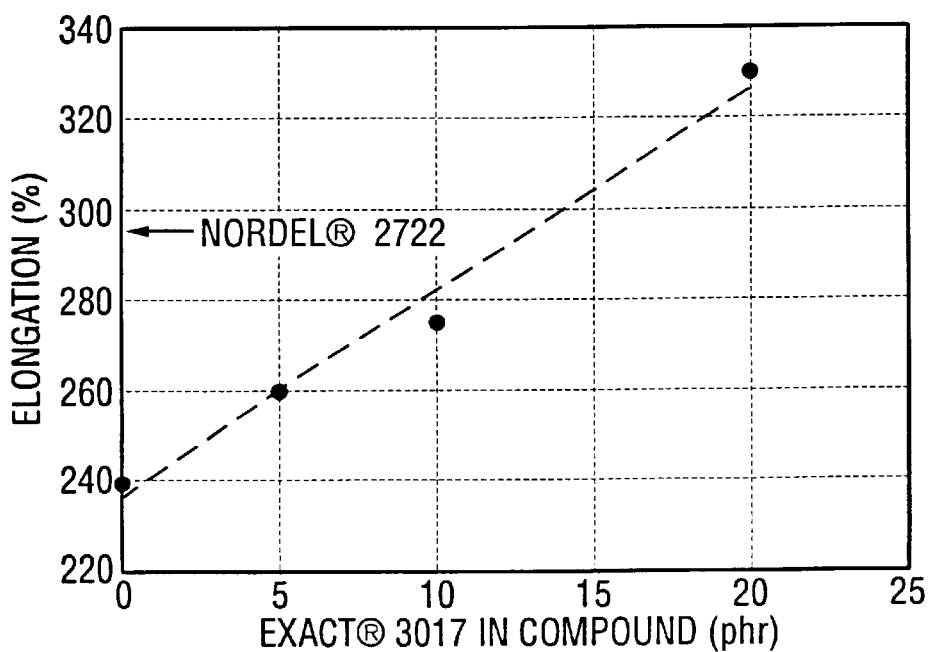
FIG. 2 shows the variation of elongation of a compound based on the blend with percent of m-ethylene copolymer as a part of the compound.
Figure 3:
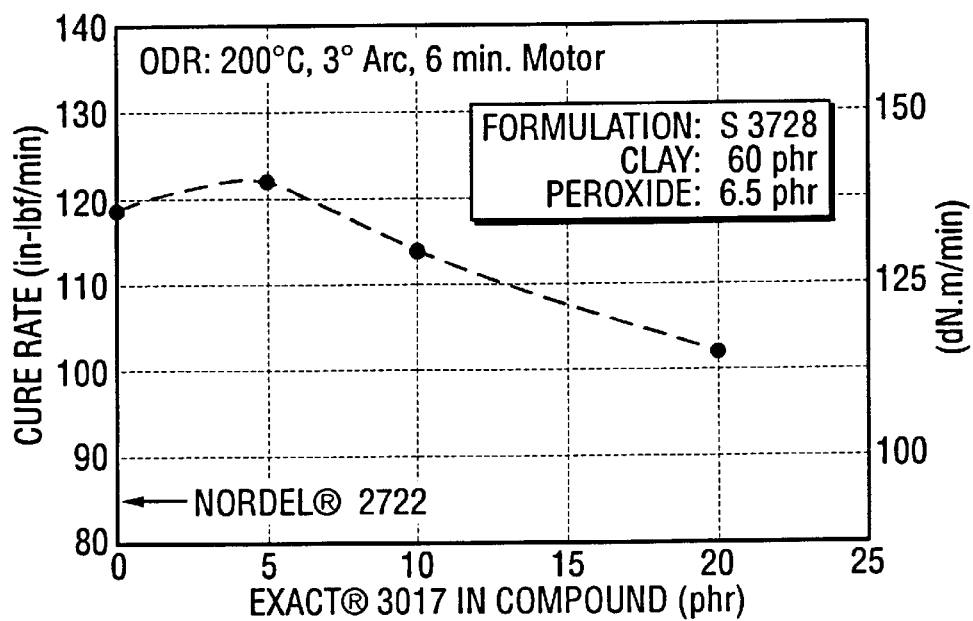
FIG. 3 shows the variation of cure rate properties of a compound based on the blend with percent m-ethylene copolymer level.
Figure 4:
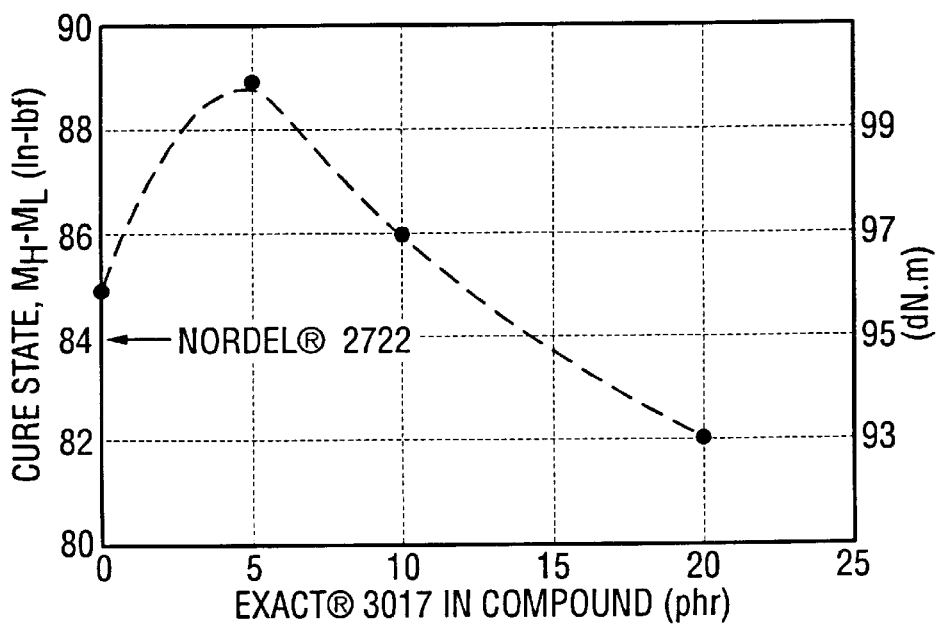
FIG. 4 shows the variation of cure state of a compound based on the blend with percent m-ethylene copolymer level.

An additional sub-set of these examples other m-ethylene copolymer (Exact® 3017) of lower molecular weight or higher melt index, were compounded with the elastomeric polymer and other ingredients. Table 9 shows the formulations with 60 phr clay, cure characteristics and physical properties of these compounds. Table 10 shows the extrusion characteristics of these compounds (Examples 9–13), showing that at a constant shear rate the mass throughput is enhanced over the compound of unblended elastomeric polymer. Table 9 shows, that the cured characteristics of these compounds again leads to improvements in physical properties (primarily elongation) over the non-blended compound. FIGS. 1 and 2 show the effect of adding Exact® 3017 (m-ethylene copolymer) on compound tensile strength and elongation. There is a decrease in tensile strength, which levels off, but elongation increases continuously. For comparison the performance of the compound containing Polymer 3 (Nordel® 2722) is also shown in the figures. At around 20 phr Exact® 3017 concentration, both tensile strength and elongation exceed the performance of Polymer 3 formulation. FIGS. 3 and 4 illustrate the effect of Exact® 3017 concentration on the cure rate and cure state respectively. The cure rate declines gradually with increasing m-ethylene copolymer, while the cure state passes through a maximum. The cure state in all the compositions is significantly higher than Polymer 3 (Nordel® 2722) formulation, while the cure state matches the Polymer 3 compound at around 15 phr Exact® 3017 concentration.

Figure 5:
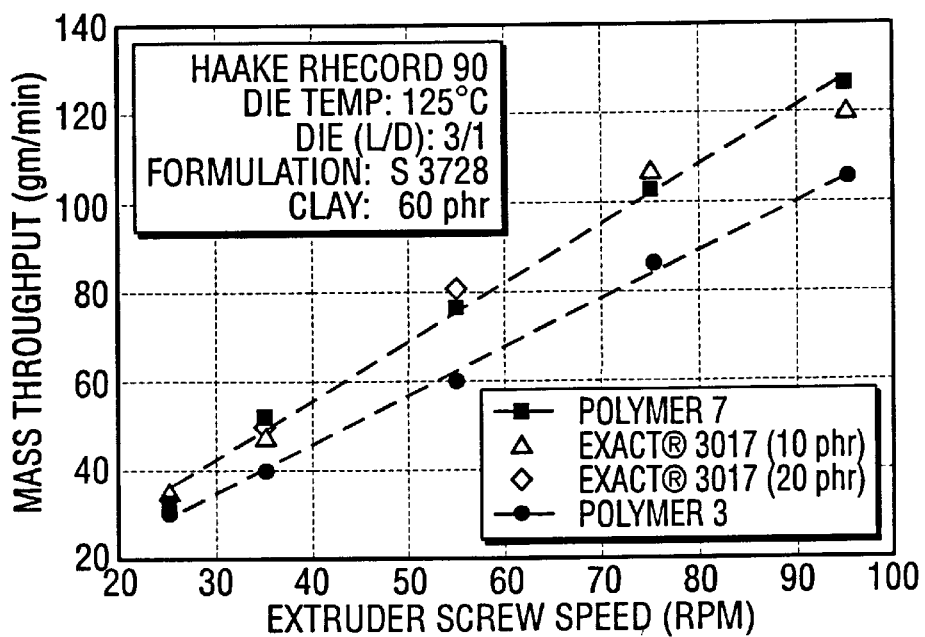
FIG. 5 shows the variation of mass rate with extruder speed for both blended and unblended elastomeric polymers.

FIG. 5 shows the variation in mass extrusion rate with extruder screw speed for formulation with the VNB elastomeric polymer (Polymer 7), Nordel® 2722 (Polymer 3), as well as blends of the VNB elastomeric polymer with 10 and 20 phr of Exact® 3017. All compounds with the VNB elastomeric polymer, and blends of Polymer 7 with Exact® 3017 have a higher mass throughput at all extrusion speeds compared to the Nordel® 2722 (Polymer 3) formulation.

Figure 6:
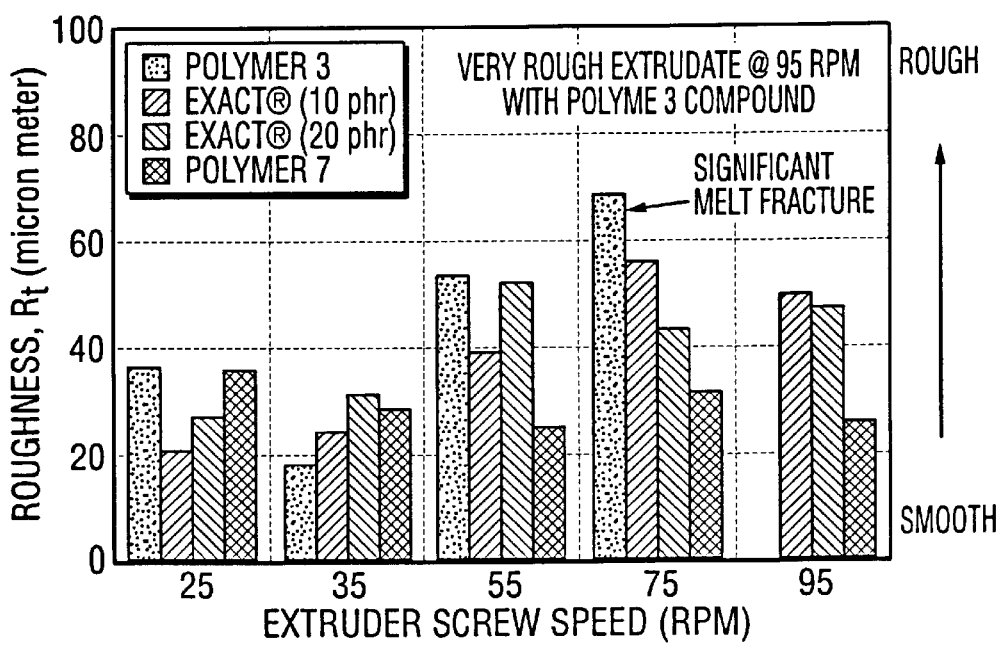
FIG. 6 shows the variation of extrudate roughness with screw speed for both blended and unblended elastomeric polymers.

FIG. 6 shows the variation in surface roughness, ($R_t$), with extrusion speed in a 60 phr clay formulation. A lower Rt value indicates a smoother surface. The comparative formulation with Polymer 3 (Nordel® 2722) shows significant melt fracture at 75 RPM which further deteriorates to a very rough surface at an extruder screw speed of 95 RPM. The formulation where the elastomeric VNB polymer (Polymer 7) is the sole component has the best extrusion surface. The blended formulation of Polymer 7 with Exact® 3017 have surface characteristics coarser than Polymer 7 compound, but significantly improved over the Polymer 3 formulation.

Figure 7:
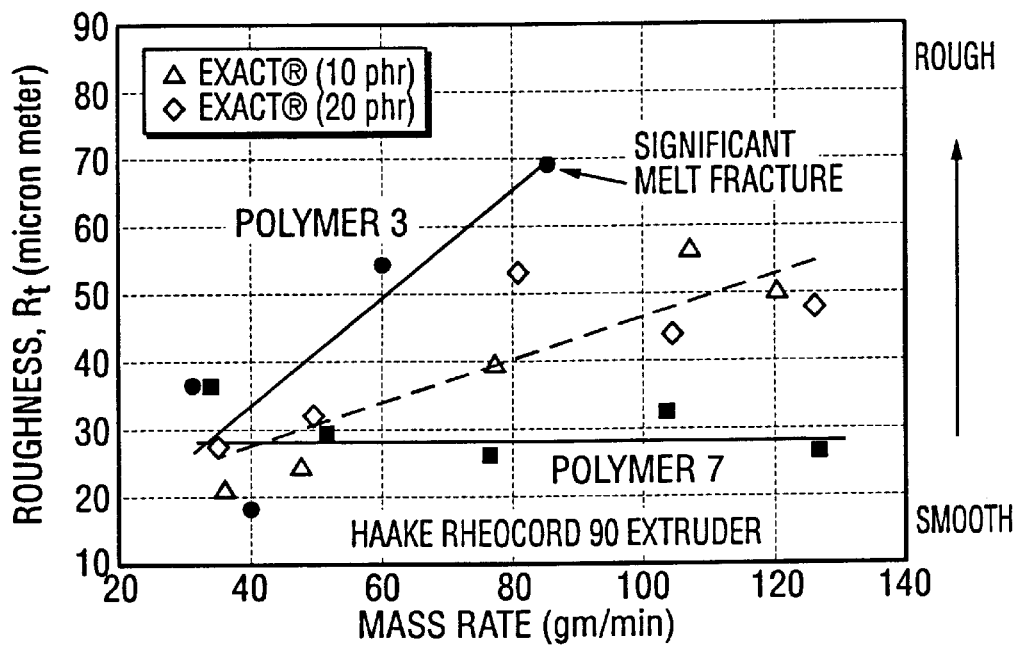
FIG. 7 shows the variation of extrudate roughness with mass rate for both blended and unblended elastomeric polymers.

FIG. 7 shows the variation of surface roughness with extruder throughput (mass rate) for the various formulations.

The formulation with Nordel® 2722 (Polymer 3) transitions vary rapidly to significant melt fracture at higher throughputs. As expected the elastomeric VNB polymer formulation (Polymer 7) shows the smoothest extrudate. The blended compounds with m-ethylene copolymer have extrudate appearance that is significantly smoother than the control Polymer 3 formulation, at high mass rates.

Although the present invention has been described in considerable detail with reference to certain preferred embodiments thereof, other versions are possible. For example, other elastomeric polymers and m-ethylene copolymers and other uses also contemplated. Additionally, while certain ingredients have been exemplified, other ingredients, and/or other inclusion levels are also contemplated. Therefore the spirit and scope of the appended claims should not be limited to the description of the preferred versions contained herein.

TABLE 1

POLYMER CHARACTERISTICS

| POLYMER | ML (1 + 4) 125° C. | Ethylene (wt. %) | Diene Type | Diene (wt. %) | BI * |
|---|---|---|---|---|---|
| Polymer 3[a] | 23 | 74 | HEX[1] | 4.0 | 0.6 |
| Polymer 7[b] | 31 | 76 | VNB[2] | 0.87 | 0.10 |

* Branching Index
[1] 1,4-Hexadiene
[2] 5-Vinyl-2-norbornene
[a] E.I. duPont, Nordel ® 2722
[b] Exxon Chemical Company

TABLE 2

MEDIUM VOLTAGE ELECTRICAL COMPOUNDS WITH 30 PHR CLAY

| Components | Description | Formulation (phr) |
|---|---|---|
| Polymer[1] | | 100 |
| Translink 37 | Calcined Clay | 30 |
| Agerite MA | Antioxidant | 1.5 |
| Drimix A 172 | Vinyl Silane | 1.0 |
| Zinc Oxide | | 5.0 |
| ERD 90 | Red Lead | 5.0 |
| Escorene LD 400 | Low Density Polyethylene | 5.0 |
| Paraffin 1236 | Wax | 5.0 |
| Curatives Dicup 40 KE | Dicumyl peroxide on clay (40% Active) | 6.5 |

[1] Includes Polymer 7 and blends of Polymer 7 with Exact ® and Engage ® polymers

TABLE 3

ETHYLENE ALPHA-OLEFIN COPOLYMER POLYMER CHARACTERISTICS

| POLYMER | Comonomer | Melt Index (dg/min) | Density (g/cc) | ML * | Ethylene (wt. %) | Diene Type | Diene (wt. %) |
|---|---|---|---|---|---|---|---|
| Exact ®[3] 4033 | C4 | 0.8 | 0.880 | 28 | 75 | none | 0 |
| Exact ® 4006 | C4 | 10 | 0.880 | | 75 | none | 0 |
| Exact ® 4041 | C4 | 3 | 0.878 | 10 | | none | 0 |
| Exact ® 3022 | C4 | 9 | 0.905 | | | none | 0 |
| Engage ®[4] 8100 | C8 | 1 | 0.870 | 20 | 76 | none | 0 |

[3] Exxon Chemical Company
[4] Dow Chemical
* ML @ (1 + 4) 125° C.

TABLE 4

TYPICAL MIXING PROCEDURE

Equipment: 1600 cc. Banbury Mixer
Batch Size: 1100 gm

| Time (minutes) | Rotor Speed (RPM) | Ingredients Addition |
|---|---|---|
| 0 | 85 | Polymer, Agerite |
| 0.5 | 85 | ½ Clay, Zinc Oxide, ERD 90, ½ Drimix, LD 400 |
| 2.0 | 100 | ¼ Clay, ¼ Drimix, ½ Wax |
| 3.0 | 100 | ¼ Clay, ¼ Drimix, ½ Wax |
| 4.0 | 100 | Sweep |
| 5.5 | 100 | Sweep |
| 7.0 | | Dump |

TABLE 5

CURE CHARACTERISTICS AND PHYSICAL PROPERTIES OF COMPOUNDS CONTAINING POLYMER 7 WITH EXACT ® 4033
Compound formulation per Table 2

| Example | | 1 | 2 | 3 |
|---|---|---|---|---|
| Polymer 7 | phr | 100 | 85 | — |
| Exact ® 4033 | phr | — | 15 | 100 |
| Mooney Scorch (MS) - 132° C., min. to 3 point rise | min | 17.8 | 14.2 | 12.9 |
| Componnd Mooney Viscosity (ML) 100° C.(1 + 8) minutes | Mooney Units | 33 | 44 | 219 |
| Rheometer 200° C., 6 min motor, 3° Arc | | | | |
| $M_L$ | dN · m | 7.2 | 9.8 | 10.5 |
| $M_H$ | dN · m | 93.1 | 94.8 | 93.6 |
| $t_{s2}$ | min | 0.59 | 0.68 | 0.57 |
| $t_{c90}$ | min | 1.76 | 1.96 | 1.96 |
| Cure Rate | dN · m/min | 113.2 | 99.1 | 75.8 |
| $M_H$—$M_J$ Cure 20 min., 165° C. | dN · m | 85.9 | 85.0 | 83.1 |
| Hardness | shore A | 84 | 84 | 91 |
| 100% Modulus | MPa | 4.3 | 3.8 | 5.8 |
| 200% Modulus | MPa | 6.7 | 6.2 | 7.9 |
| 300% Modulus | MPa | — | 9.0 | 10.1 |
| Tensile Strength | MPa | 8.3 | 9.9 | 15.1 |
| Elongation | % | 265 | 319 | 522 |

TABLE 6

EXTRUSION CHARACTERISTICS OF COMPOUNDS CONTAINING POLYMER 7 WITH EXACT ® 4033
Compound formulation per Table 2

| Example | | Screw Speed (rpm) | 1 | 2 | 3 |
|---|---|---|---|---|---|
| Polymer 7 | phr | | 100 | 85 | — |
| Exact ® 4033 | phr | | — | 15 | 100 |
| Mass Extrusion Rate | g/min | 30 | 40.9 | 44.9 | 49.4 |
| Extrudate Roughness - R Factor | μm | | 6.2 | 3.6 | 2.6 |
| Mass Extrusion Rate | g/min | 60 | 82.0 | 84.3 | 97.0 |
| Extrudate Roughness - R Factor | μm | | 4.3 | 8.3 | 23.7 |
| Mass Extusion Rate | g/min | 90 | 114.9 | 110.0 | 140.4 |
| Extrudate Roughness - R Factor | μm | | 3.8 | 9.1 | too rough |

TABLE 7

CURE CHARACTERISTICS AND PHYSICAL PROPERTIES OF COMPOUNDS CONTAINING POLYMER 7 WITH EXACT ® AND ENGAGE ® POLYMERS
Compound formulation per Table 2

| Example | | 4 | 5 | 6 | 7 | 8 |
|---|---|---|---|---|---|---|
| Polymer 7 | phr | 100 | 85 | 85 | 85 | 85 |
| Exact ® 4006 | phr | — | 15 | — | — | — |
| Exact ® 4041 | phr | — | — | 15 | — | — |
| Exact ® 3022 | phr | — | — | — | 15 | — |
| Engage ® 8100 | phr | — | — | — | — | 15 |
| Mooney Scorch (MS) - 132° C., time to 3 point rise | min | 17.8 | 17.9 | 15.1 | 16.6 | 14.7 |
| Compound Mooney Viscosity (ML) 100 ° C. (1 + 8) minutes | Mooney Units | 33 | 31 | 36 | 34 | 37 |
| Rheometer 200° C. 6 min motor, 3° Arc | | | | | | |
| $M_L$ | dN·m | 7.2 | 6.6 | 7.7 | 6.9 | 8.2 |
| $M_H$ | dN·m | 93.1 | 90.3 | 94.6 | 94.6 | 92.2 |
| $t_{s2}$ | min | 0.59 | 0.63 | 0.58 | 0.62 | 0.60 |
| $t_{c90}$ | min | 1.76 | 1.87 | 1.81 | 1.86 | 1.83 |
| Cure Rate | dN·m/min | 113.2 | 100.3 | 103.8 | 105.1 | 101.3 |
| $M_H - M_L$ | dN·m | 85.9 | 83.7 | 86.9 | 87.7 | 84.0 |
| Cure 20 min. 165° C. | | | | | | |
| Hardness | shore A | 84 | 85 | 85 | 86 | 84 |
| 100% Modulus | MPa | 4.3 | 4.3 | 3.8 | 4.9 | 3.6 |
| 200% Modulus | MPa | 6.7 | 7.0 | 6.4 | 7.6 | 6.2 |
| Tensile Strength | MPa | 8.3 | 9.4 | 9.4 | 10.2 | 8.8 |
| Elongation | % | 265 | 286 | 293 | 299 | 292 |

TABLE 8

EXTRUSION CHARACTERISTICS OF FORMULATIONS CONTAINING POLYMER 7 WITH EXACT ® AND ENGAGE ® POLYMERS
Compound formulation per Table 2

| Example | | Screw Speed (rpm) | 4 | 5 | 6 | 7 | 8 |
|---|---|---|---|---|---|---|---|
| Polymer 7 | phr | | 100 | 85 | 85 | 85 | 85 |
| Exact ® 4006 | phr | | — | 15 | — | — | — |
| Exact ® 4041 | phr | | — | — | 15 | — | — |
| Exact ® 3022 | phr | | — | — | — | 15 | — |
| Engage ® 8100 | phr | | — | — | — | — | 15 |
| Mass Extrusion Rate | g/min | 30 | 40.9 | 45.7 | 47.9 | 46.8 | 41.5 |
| Extrudate Roughness - R Factor | μm | | 6.2 | 8.4 | 11.5 | 4.2 | 9.0 |
| Mass Extusion Rate | g/min | 60 | 82.0 | 85.5 | 87.5 | 84.2 | 84.2 |
| Extrudate Roughness - R Factor | μm | | 4.3 | 5.2 | 6.0 | 4.7 | 8.3 |
| Mass Extrusion Rate | g/min | 90 | 114.9 | 108.6 | 125.4 | 120.5 | 114.8 |
| Extrudate Roughness - R Factor | μm | | 3.8 | 3.5 | 6.4 | 5.6 | 8.5 |

TABLE 9

CURE CHARACTERISTICS AND PHYSICAL PROPERTIES OF COMPOUNDS CONTAINING EXACT ® 3017 POLYMER WITH 60 PHR CLAY

| Compound No. | | | 9 | 10 | 11 | 12 | 13 |
|---|---|---|---|---|---|---|---|
| INGREDIENT | PHR | | | | | | |
| Polymer 3 | | | 100 | — | — | — | — |
| Polymer 7 | | | — | 100 | 95 | 90 | 80 |
| EXACT ® 3017 | | | — | — | 5 | 10 | 20 |
| Translink 37 Clay | | | 60 | 60 | 60 | 60 | 60 |
| Agerite MA | | | 1.5 | 1.5 | 1.5 | 1.5 | 1.5 |
| Drimix A 172 | | | 1 | 1 | 1 | 1 | 1 |
| Zinc Oxide | | | 5 | 5 | 5 | 5 | 5 |
| ERD 90 | | | 5 | 5 | 5 | 5 | 5 |
| Escorene LD 400 | | | 5 | 5 | — | — | — |
| Paraffin Wax 1236 | | | 5 | 5 | 5 | 5 | 5 |
| DiCup 40 KE | | | 6.5 | 6.5 | 6.5 | 6.5 | 6.5 |
| Specific Gravity | | 1.2 | | | | | |
| Total PHR | | 189.0 | | | | | |
| Batch Factor | | 6.35 | | | | | |
| Batch Weight (gm) | | 1200 | | | | | |
| Fill Factor (%) | | 63 | | | | | |
| COMPOUND MOONEY VISCOSITY | | | | | | | |
| ML@ (1 + 8) 100° C. | MU | | 38 | 31 | 29 | 29 | 25 |
| MOONEY SCORCH | | | | | | | |
| Ms(t3), 132° C. | min | | 20 | 11 | 12 | 20 | 21 |
| ODR 200° C., 3° arc | | | | | | | |
| ML, minimum | dN·m | | 9 | 7 | 7 | 6 | 5 |
| MH, maximum | dN·m | | 108 | 103 | 107 | 104 | 98 |
| ts2, scorch | min | | 0.7 | 0.5 | 0.6 | 0.6 | 0.6 |
| tc90, cure | min | | 2.0 | 1.7 | 1.7 | 1.8 | 1.8 |
| Cure Rate | dN·m/min | | 97 | 134 | 138 | 129 | 115 |
| MH—ML, cure state | dN·m | | 94 | 96 | 100 | 98 | 93 |
| PHYSICAL PROPERTIES press cured, 20 min @ 165° C. | | | | | | | |
| Hardness | shore A | | 89 | 87 | 85 | 89 | 88 |
| 100% Modulus | MPa | | 5.6 | 6.7 | 5.7 | 5.7 | 5.9 |
| 200% Modulus | MPa | | 8.7 | 10.1 | 8.9 | 8.7 | 8.7 |
| 300% Modulus | MPa | | x | x | x | x | 10.0 |
| Tensile Strength | MPa | | 10.0 | 11.0 | 9.9 | 10.0 | 10.4 |
| Elongation At Break | % | | 295 | 240 | 260 | 275 | 330 |

TABLE 10

EXTRUSION OF ELECTRICAL COMPOUNDS
CONTAINING EXACT ® 3017 POLYMER

Extruder: HAAKE Rheocord 90
2:1 CR Screw
Die Diameter: 0.125 inches
Die Land Length: 0.375 inches
Die Temperature: 125° C.

| Cmpd. No. | Polymer | RPM | Shear Rate (1/sec) | Mass Rate (g/min) | Vol. Rate (cc/min) | Die Pressure Drop (MPa) | Surface Roughness, $R_f$ ($\mu$m) |
|---|---|---|---|---|---|---|---|
| 9 | Polymer 3 | 25 | 130 | 31 | 25 | 6.0 | 37 |
| | | 35 | 170 | 40 | 32 | 6.6 | 18 |
| | | 55 | 255 | 60 | 49 | 7.5 | 54 |
| | | 75 | 370 | 86 | 70 | 8.3 | 69 |
| | | 95 | 450 | 105 | 85 | 8.6 | too rough |
| 10 | Polymer 7 | 25 | 145 | 34 | 27 | 5.9 | 36 |
| | | 35 | 220 | 52 | 42 | 6.7 | 29 |
| | | 55 | 330 | 77 | 62 | 7.6 | 26 |
| | | 75 | 445 | 103 | 84 | 8.2 | 32 |
| | | 95 | 540 | 126 | 102 | 8.5 | 26 |
| 12 | EXACT ® 3017 (10 phr) | 25 | 155 | 36 | 29 | 5.7 | 21 |
| | | 35 | 210 | 48 | 39 | 6.3 | 25 |
| | | 55 | 340 | 78 | 64 | 7.3 | 40 |
| | | 75 | 460 | 107 | 87 | 8.0 | 57 |
| | | 95 | 515 | 120 | 97 | 8.3 | 50 |
| 13 | EXACT ® 3017 (20 phr) | 25 | 150 | 35 | 28 | 5.4 | 28 |
| | | 35 | 215 | 50 | 40 | 6.1 | 32 |
| | | 55 | 350 | 81 | 66 | 7.1 | 53 |
| | | 75 | 450 | 104 | 85 | 7.7 | 44 |
| | | 95 | 545 | 126 | 102 | 8.2 | 48 |

Based on formulation of Table 9

What is claimed is:

1. A power cable coating compound comprising an ethylene, alpha-olefin, vinyl norbornene elastomeric polymer and an ethylene alpha-olefin copolymer said copolymer wherein:

a) said elastomeric polymer has a BI less than about 0.4, an ethylene content in the range of 50–90 mole percent, a vinyl norbornene content in the range of 0.16–1.5 mole percent, and a $M_w/M_n$ greater than about 10; and b) said ethylene alpha-olefin copolymer has a $M_w/M_n$ less than about 3, a CDBI greater than about 60% wherein a compound including said elastomeric polymer and said ethylene alpha-olefin copolymer has a cure rate above about 100 dN.m/min, a cure state above about 90 dN.m/min, a tensil strength above about 9 MPa and an elongation above about 250%.

* * * * *